United States Patent
Kawai et al.

(10) Patent No.: US 10,782,521 B2
(45) Date of Patent: Sep. 22, 2020

(54) VIRTUAL IMAGE DISPLAY DEVICE

(71) Applicant: NIPPON SEIKI CO., LTD., Niigata (JP)

(72) Inventors: Takeru Kawai, Niigata (JP); Yuta Kikuchi, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 93 days.

(21) Appl. No.: 16/328,001

(22) PCT Filed: Sep. 1, 2017

(86) PCT No.: PCT/JP2017/031632
§ 371 (c)(1),
(2) Date: Feb. 25, 2019

(87) PCT Pub. No.: WO2018/043713
PCT Pub. Date: Mar. 8, 2018

(65) Prior Publication Data
US 2019/0196186 A1    Jun. 27, 2019

(30) Foreign Application Priority Data

Sep. 5, 2016   (JP) .................................. 2016-173207

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 27/01* (2013.01);
(Continued)

(58) Field of Classification Search
CPC .................................................. G02B 27/0101
(Continued)

(56) References Cited

U.S. PATENT DOCUMENTS

2014/0049819 A1*   2/2014   Piehler ................... G02B 13/08
359/448

FOREIGN PATENT DOCUMENTS

JP   2009-163122 A   7/2009
JP   2010-085962 A   4/2010
(Continued)

OTHER PUBLICATIONS

International Search Report issued in corresponding International Patent Application No. PCT/JP2017/031632, dated Nov. 21, 2017, with English Translation.

*Primary Examiner* — James C. Jones
(74) *Attorney, Agent, or Firm* — McDermott Will & Emery LLP (57) ABSTRACT

The present invention makes it possible to reduce a difference in resolution between respective regions of a virtual image while reducing distortion of an image. A translucent screen is disposed to be inclined with respect to an optical axis of projection light such that a difference between a first optical path length to a first reflection part of the display light emitted from a first end far from display light reflected toward a second reflection part by the first reflection part, and a second optical path length of display light emitted from a second end closer to reflected toward the second reflection part by the first reflection part than the first end becomes smaller.

6 Claims, 6 Drawing Sheets

(51) Int. Cl.
*G03B 21/10* (2006.01)
*G09F 9/00* (2006.01)

(52) U.S. Cl.
CPC ............... *G03B 21/10* (2013.01); *G09F 9/00* (2013.01); *B60K 2370/334* (2019.05); *G02B 2027/011* (2013.01)

(58) Field of Classification Search
USPC ......................................................... 359/630
See application file for complete search history.

(56) References Cited

FOREIGN PATENT DOCUMENTS

| | | |
|---|---|---|
| JP | 2011-105306 A | 6/2011 |
| JP | 2014-170112 A | 9/2014 |
| JP | 2015-197495 A | 11/2015 |
| WO | 2016/136827 A1 | 9/2016 |

* cited by examiner

PRIOR ART

PRIOR ART

FIG.8

VIRTUAL IMAGE DISPLAY DEVICE

CROSS REFERENCE

This application is the U.S. National Phase under 35 U.S.C. § 371 of International Application No. PCT/JP2017/031632, filed on Sep. 1, 2017, which claims the benefit of Japanese Application No. 2016-173207, filed on Sep. 5, 2016, the entire contents of each are hereby incorporated by reference.

TECHNICAL FIELD

The present invention relates to a virtual image display device that allows a driver of a vehicle to visually recognize a virtual image.

BACKGROUND ART

A conventional virtual image display device is such that a display device projects an image on a projection member (windshield of a vehicle) located forward of a viewer, thereby allowing visual recognition of a virtual image. In such a virtual image display device, it is common to reflect display light of the image displayed by the display device by a reflection part (relay optical system) such as a mirror or a projection member (relay optical system) and fold or enlarge it. Therefore, a part of the image is enlarged or reduced, and a distorted virtual image is visually recognized.

The virtual image display device disclosed in Patent Literature 1 displays an image that has been subjected to a process called warping which expands or narrows down a part of the image so as to cancel distortion of a virtual image caused by the relay optical system, thereby allowing visual recognition of a virtual image with less distortion.

CITATION LIST

Patent Literature

Patent Literature 1: Japanese Patent Application No. 2011-105306

SUMMARY OF THE INVENTION

Problems to be Solved by the Invention

However, in a case where distortion of a virtual image is reduced only by such a warping process, it is necessary to largely warp the image. In other words, it is necessary to largely expand or largely narrow down a part of the image, and even when a same image is displayed, a size of a region to be displayed on a display device is different between an expanded region and a narrowed down region. That is, a number of pixels constituting an image to be displayed in the expanded region and a number of pixels constituting an image to be displayed in the narrowed down region are greatly different, and thus there has been a problem that resolution is greatly different in respective regions of the virtual image.

Accordingly, one of the problems of the present invention is to provide a virtual image display device capable of reducing a difference in resolution of respective regions of a virtual image.

Solution to Problem

A first aspect of the present invention relates to a virtual image display device comprising: a projector (10) configured to emit projection light (100); a translucent screen (20) configured to receive on a back surface side the projection light emitted from the projector to form an image (M), and to emit display light (200) of the image from a front surface side; a first reflection part (30) configured to reflect the display light emitted from respective regions (20a, 20b, 20c) arranged in a first direction of the translucent screen in order for the display light to cross with one another; and a second reflection part (40) configured to reflect the display light reflected by the first reflection part to project the display light on a projection member located forward of a viewer, wherein the translucent screen is disposed inclined with respect to an optical axis of the projection light in such a manner that a difference between, a first optical path length (201L) of the display light emitted to the first reflection part from a first end (21) being far from the display light reflected toward the second reflection part by the first reflection part and a second optical path length (202L) of the display light emitted from a second end (22) being closer to the display light reflected toward the second reflection part by the first reflection part than the first end, becomes smaller than that when the translucent screen is disposed vertically to the optical axis (103) of the projection light.

Effect of the Invention

According to the present invention, it is possible to reduce a difference in resolution of respective regions of a virtual image while reducing distortion of an image.

MODE FOR CARRYING OUT THE INVENTION

An embodiment of the present invention is described in detail below with reference to the drawings as appropriate. However, a detailed description of an already well-known feature or a substantially same configuration may be omitted. The gist of the present invention is not limited to the accompanying drawings and the following description, and various modifications are possible without departing from the present invention.

First Embodiment

A first embodiment of the present invention will be described with reference to the drawings. In order to facilitate the following description, as viewed from a viewer who visually recognizes a virtual image generated by a virtual image display device 1, a front-rear direction is defined as a Z-axis, an up-and-down direction is defined as an X-axis, and a left-right direction is defined as a Y-axis direction. In this case, an X-axis positive direction represents an upward direction, a Y-axis positive direction represents a right direction, and a Z-axis positive direction represents a forward direction. Hereinafter, when simply referring to the up-and-down direction, the X-axis direction is indicated, and when simply referring to the left-right direction, the Y-axis direction is indicated. In addition, a direction on a translucent screen 20, in which respective regions 20a, 20b, 20c from which display light 200 crossing between a first reflection part 30 and a second reflection part 40 is emitted are arranged is defined as a first direction Dx, and a direction on the translucent screen 20, which is orthogonal to this first direction Dx is defined as a second direction Dy. In addition, a direction in which the first reflection part 30 receives the display light 200 emitted from the respective regions 20a, 20b, 20c along the first direction Dx of the translucent screen 20 is defined as a third direction Ex, and a direction on the first reflection part 30, which is orthogonal to this third direction Ex is defined as a fourth direction Ey. In addition, a direction in which the second reflection part 40 receives the display light 200 emitted from the respective regions 20a, 20b, 20c along the first direction Dx of the translucent screen 20 is defined as a fifth direction Fx, and a direction on the second reflection part 40, which is orthogonal to this fifth direction Fx is defined as a sixth direction Fy. Luminous flux is essentially is comprised of an infinite number of light rays; however, in the drawings used in the description of the embodiment of the present invention, a principal ray of projection light 100 incident on the respective regions of the translucent screen 20 and a principal ray of the display light 200 emitted from the respective regions of the translucent screen 20 are shown, and other light rays are omitted.

Figure 1:
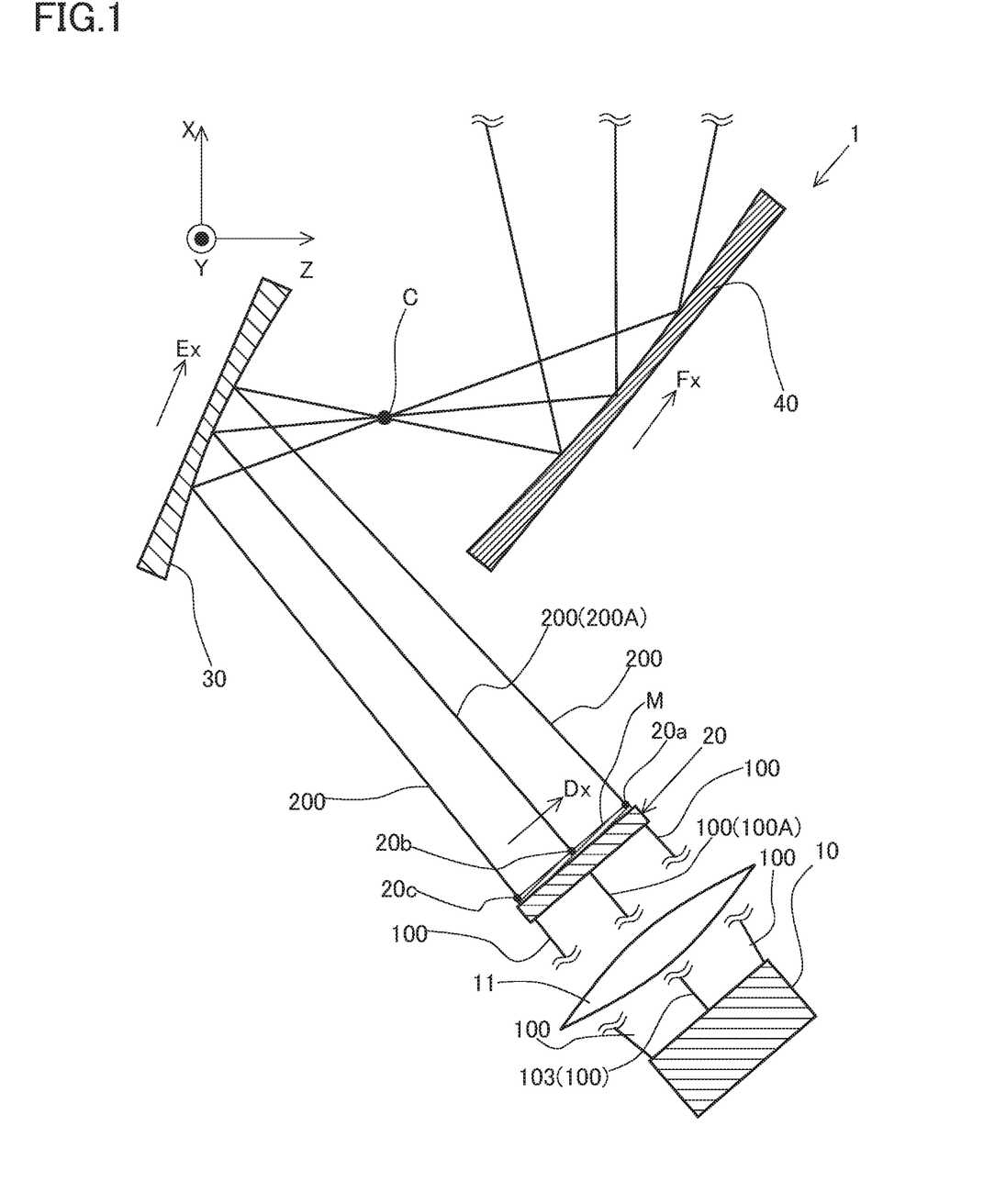
FIG. 1 is a diagram showing a configuration of a virtual image display device according to an embodiment of the present invention as viewed from a Y-axis direction.

FIG. 1 is a schematic configuration diagram showing a configuration of a virtual image display device 1 according to this embodiment. The virtual image display device 1 according to this embodiment is installed in a dashboard of a vehicle. The virtual image display device 1 emits the display light 200 to a windshield (projection member) of the vehicle. The display light 200 reflected by the windshield is directed to an eye box (not shown). When a viewpoint position of a user is within the eye box, the user visually recognizes a virtual image with a desired luminance generated by the display light 200. Through the windshield, the user overlaps the virtual image with a real scenery ahead of the vehicle and recognizes the virtual image as if it is far away.

As shown in FIG. 1, the virtual image display device 1 includes: a projector 10 that projects the projection light 100; a translucent screen 20 that receives this projection light 100 to form an image M that is a real image; a first reflection part 30 that reflects the display light 200 based on the image M displayed on the translucent screen 20; a second reflection part 40 that projects the display light 200 reflected by the first reflection part 30 toward the windshield; a casing (not shown) that houses these; and a control unit (not shown) that performs electrical control of the virtual image display device 1.

The projector 10 emits the projection light 100 to project the image M on the translucent screen 20, and for example, a reflective projector such as a DMD (Digital Micromirror Device) or LCOS (registered trademark: Liquid Crystal on Silicon), a scanning type projector that scans laser light, or the like is employed. The projector 10 generates the projection light 100 on the basis of corrected image data obtained by warping image data displayed by the aforementioned control unit and emits same. As a distance from the projector 10 increases, the projection light 100 emitted from the projector 10 travels as divergent light in which a cross-sectional area of the projection light 100 increases. Accordingly, an area on which the projection light 100 is projected increases as the distance from the projector 10 increases.

The light distribution adjustment part 11 is disposed in a vicinity of the translucent screen 20 on an optical path of the projection light 100 directed from the projector 10 to the translucent screen 20 so as to be substantially parallel to the translucent screen 20, and adjusts by refracting the projection light 100, a direction of the principal ray (light distribution) of the display light 200 emitted from the respective regions of the translucent screen 20. The light distribution adjustment part 11 is a lens having a biconvex free curved surface with a different curvature between the first direction Dx extending in a vertical direction with respect to an optical axis 100A of the projection light 100 and the second direction Dy orthogonal to this first direction Dx, and is disposed on the optical path of projection light 100 directed from the projector 10 to the translucent screen 20. The light distribution adjustment part 11 may be composed of a cylindrical lens that has a positive power to refract the projection light 100 in a convergence direction in the first direction Dx and has no power to refract the projection light 100 in the second direction Dy.

The translucent screen 20 is a diffusion film formed of a resin such as polycarbonate, and images the projection light 100 emitted from the projector 10 as the image M, and emits the display light 200 diffused with a constant distribution. Light distribution of the display light 200 emitted from the translucent screen 20 is adjusted for each region of the translucent screen 20 by an action of the light distribution adjustment part 11. By the action of the light distribution adjustment part 11, the display light 200 emitted from the other respective regions 20a, 20b, 20c along with the first direction Dx of the translucent screen 20 converges to an optical axis 200A of the display light 200 as it travels toward the first reflection part 30. Meanwhile, the display light 200 emitted from the respective regions along the second direction Dy of the translucent screen 20 diverges from the optical axis 200A of the display light 200 as it travels toward the first reflection part 30. The light distribution adjustment part 11 adjusts the light distribution of the display light 200 emitted from the respective regions of the translucent screen 20 by refracting the projection light 100 directed from the projector 10 to the translucent screen 20, thereby enabling the display light 200 to be efficiently directed to an eye box direction.

The first reflection part 30 is disposed on the optical path of the display light 200 emitted from the translucent screen 20 and reflects the display light 200 toward the second reflection part 40 that will be described later. The first reflection part 30 is a curved surface mirror having a free curved surface with a different curvature between an Ex-axis direction in which the display light 200 emitted from the respective regions 20a, 20b, 20c along the first direction Dx of the translucent screen 20 is received and an Ey direction that is orthogonal to this Ex-axis direction, and has a positive optical power that crosses, the display light 200 reflected by the respective regions of the first reflection part 30 along at least one direction, before the display light 200 reaches the second reflection part 40. For example, the first reflection part 30 has the positive optical power in the Ex direction in which the display light 200 emitted from the respective regions 20a, 20b, 20c along the first direction Dx of the translucent screen 20 is received and has no optical power in the Ey direction in which the display light 200 emitted from the respective regions along the second direction Dy of the translucent screen 20 is received. With this, the display light 200 emitted from the respective regions 20a, 20b, 20c along the first direction Dx of the translucent screen 20 travels as convergent light by the first reflection part 30, and crosses at a predetermined cross point C between the first reflection part 30 and the second reflection part 40. The display light 200 emitted from the respective regions along the second direction Dy of the translucent screen 20 travels to the second reflection part 40 as divergent light by the first reflection part 30.

The second reflection part 40 has a free curved surface having a concave reflection surface, and can be designed in such a manner that the distortion of the aforementioned virtual image can be minimized. In addition, the second reflection part 40 enlarges the display light 200 reflected by the second reflection part 40 to reflect same toward the windshield. The second reflection part 40 may have an actuator (not shown) capable of adjusting an angle of the second reflection part 40.

The above is the configuration of the virtual image display device 1 in this embodiment. Hereinafter, an arrangement and an effect of each component in the virtual image display device 1 of this embodiment will be described while comparing them with a comparative example. First, a virtual image display device 400 of the comparative example will be described with reference to FIGS. 6 to 8.

Comparative Example

Figure 6:
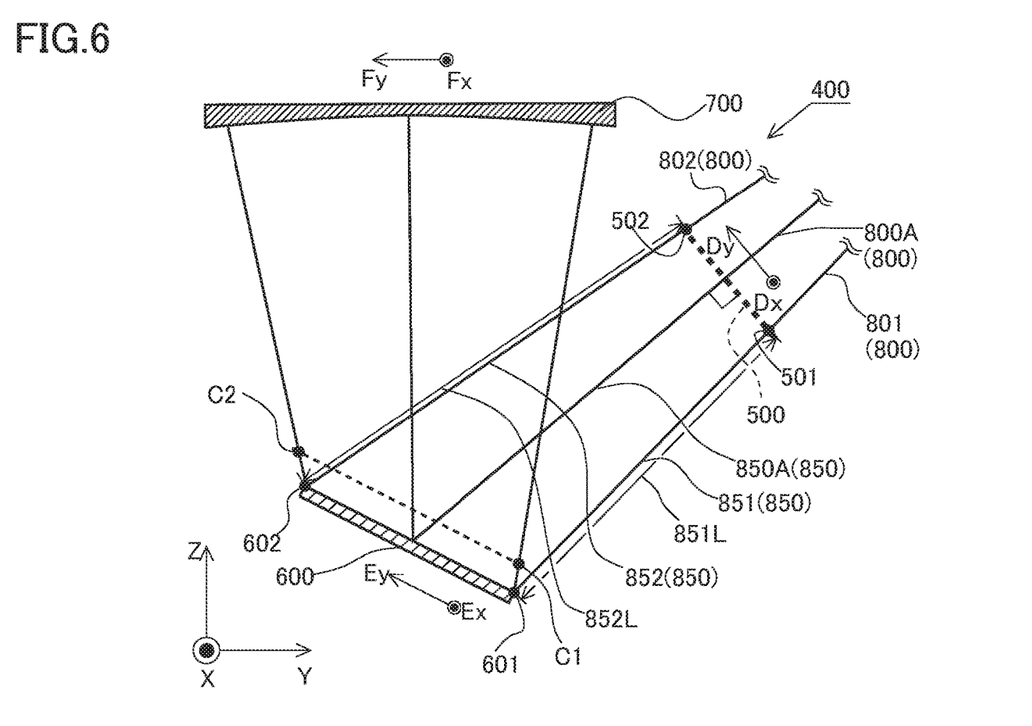
FIG. 6 is a diagram of a virtual image display device in a comparative example as viewed from the X-axis direction.
Figure 7:
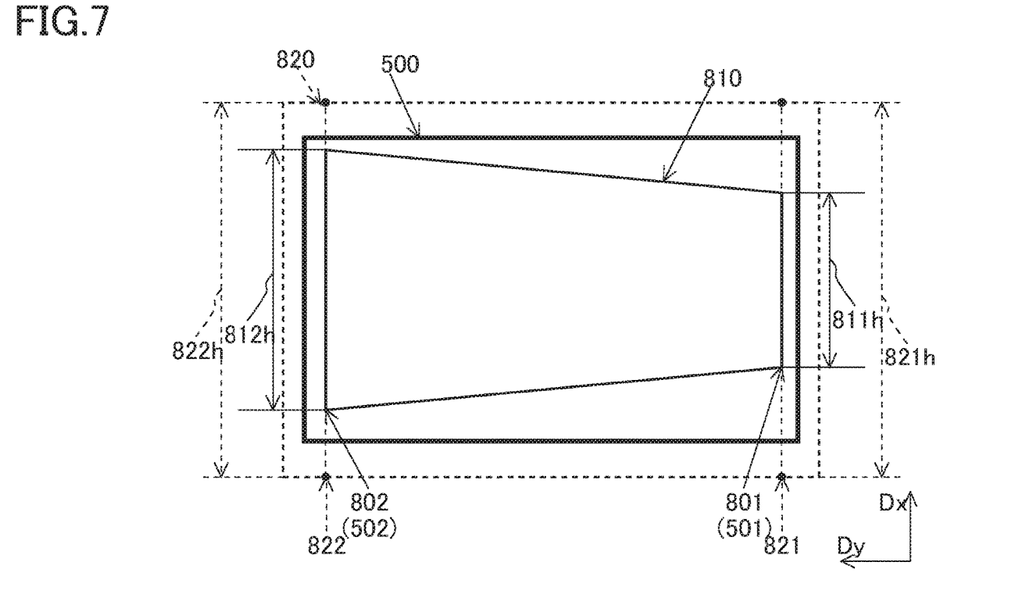
FIG. 7 is a front view of a translucent screen in the comparative example.

FIG. 6 is a view of a virtual image display device 400 of a comparative example as viewed from above (X-axis positive direction). Projection light 800 in FIG. 6 shows projection light emitted from a projector (not shown) when the virtual image display device 400 of the comparative example displays a rectangular virtual image, and projection light 801 shows projection light incident on a first end 501 located shifted more in a negative direction of the first direction Dx than a position on a translucent screen 500, on which an optical axis 800A of the projection light 800 is incident, and projection light 802 shows projection light incident on a second end 502 located shifted more in a positive direction of the first direction Dx than a position on the translucent screen 500, on which the optical axis 800A of the projection light 800 is incident. In addition, FIG. 7 is a front view of a conventional translucent screen 500 and illustrates a relation between a range 810 (hereinafter also referred to as a rectangular projection range 810) on the translucent screen 500 on which a conventional projector projects the projection light 800 when generating a rectangular virtual image and a maximum range 820 (hereinafter also referred to as a projectable range 820) on which the conventional projector in a same plane (Dx-Dy plane) as the translucent screen 500 can project the projection light 800. In addition, FIG. 8 conceptually shows an optical path of display light 850 (display light 851, 852) directed from the conventional translucent screen 500 to the second reflection part 700.

The translucent screen 500 of the comparative example shown in FIG. 6 is disposed so as to be orthogonal to the optical axis 800A of the projection light 800 emitted from a projector (not shown) when viewed from the first direction Dx in which the respective regions of the translucent screen 500 from which the display light 850 crossing between the first reflection part 600 and the second reflection part 700 is emitted are arranged. Therefore, the optical path length of the projection light 801 from the first end 501 of the translucent screen 500 shown in FIG. 6 to the aforementioned projector and the optical path length of the projection light 802 from the second end 502 of the translucent screen 500 to the aforementioned projector become equal. Accordingly, as shown in FIG. 7, the projectable range 820 of the projection light 800 emitted from the aforementioned projector has a rectangular shape in which a range 821h of the first direction Dx at an end 821 located in a negative direction of the second direction Dy is equal to a range 822h of the first direction Dx at an end 822 located in a positive direction of the second direction Dy.

In addition, the translucent screen 500 of the comparative example shown in FIG. 6 is disposed so as to be orthogonal to the optical axis 800A of the projection light 800 emitted from the projector (not shown), and thus an optical path length 851L of the display light 851 which is emitted from the first end 501 of the translucent screen 500 on the basis of the projection light 801 and is incident on a first incident position 601 of the first reflection part 600 becomes shorter than an optical path length 852L of the display light 852 which is emitted from the second end 502 of the translucent screen 500 on the basis of the projection light 802 and is incident on a second incident position 602 of the first reflection part 600 (optical path length 851L<852L).

Figure 8:
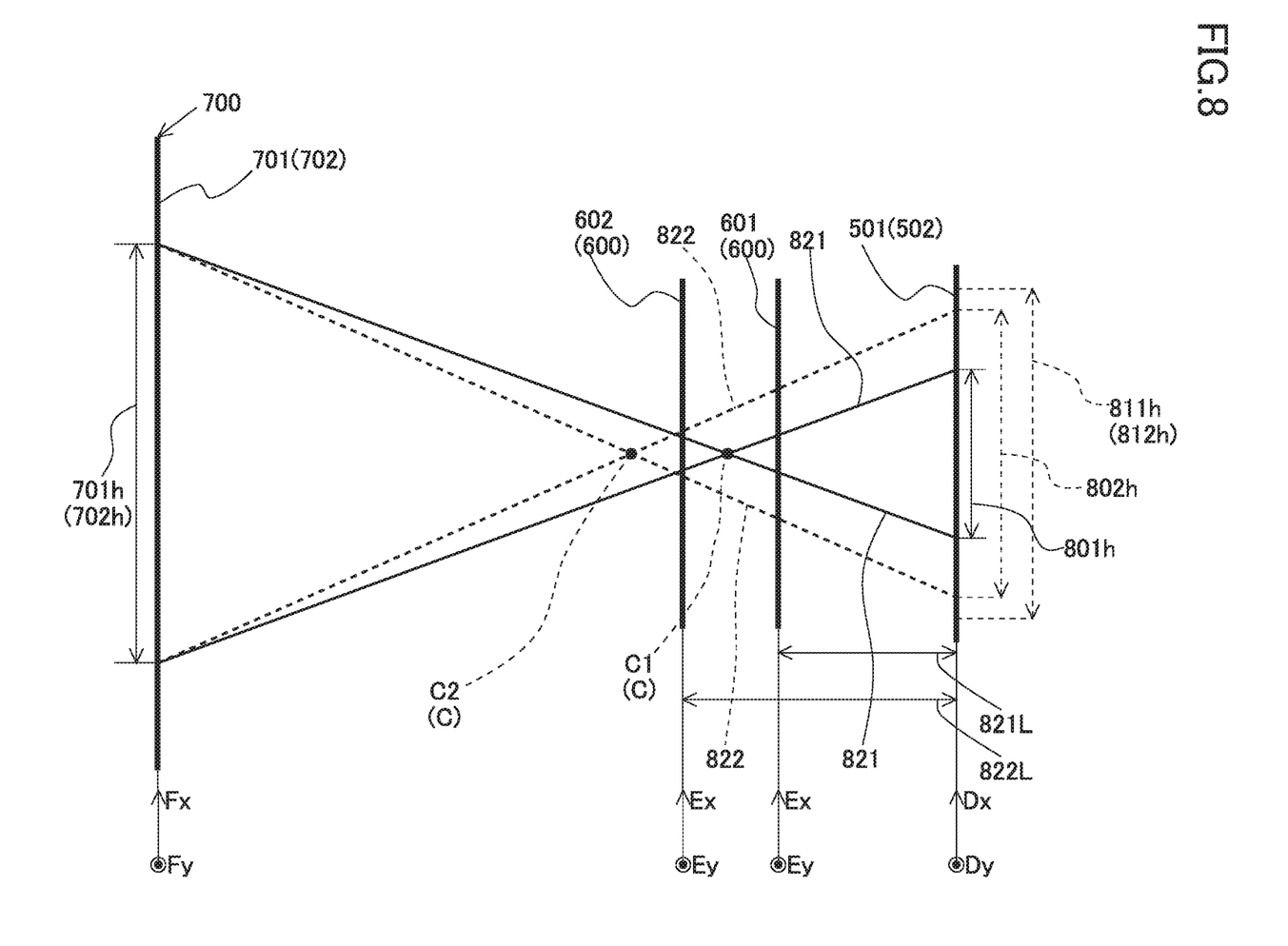
FIG. 8 is a diagram illustrating an optical path of display light in the comparative example.

In other words, as shown in FIG. 8, the first incident position 601 on which the display light 851 having the short optical path length 851L is incident in the first reflection part 600 is disposed closer to the translucent screen 500 than the second incident position 602 on which the display light 852 having the optical path length 852L longer than the optical path length 851L is incident. By tracing the display light 851 from the second reflection part 700 to the first end 501 of the translucent screen 500 crossing at the cross point C1, with reference to a range 701h on the second reflection part 700 in such a manner that the range 701h in the fifth direction Fx in which the display light 851 is projected on the second reflection part 700 and a range 702h in the fifth direction Fx in which the display light 852 is projected on the second reflection part 700 become equal, a range 801h in the first direction Dx of the projection light 800 on the first end 501 of the translucent screen 500 is roughly determined. Meanwhile, by tracing the display light 852 from the second reflection part 700 to the second end 502 of the translucent screen 500 crossing at the cross point C2, with reference to the range 702h on the second reflection part 700, a range 802h in the first direction Dx of the projection light 800 on the second end 502 of the translucent screen 500 is roughly determined.

Referring again to FIG. 7, a range 811h in the first direction Dx of the projection light 800 at the first end 501 on the translucent screen 500 becomes shorter than a range 812h in the first direction Dx of the projection light 800 at the second end 502 on the translucent screen 500. By projecting the projection light 800 on such rectangular projection range 810, for example, a rectangular virtual image having a same height in a left side (Y-axis negative direction) and in a right side (Y-axis positive direction) as viewed from the viewer can be generated. However, in the virtual image display device 400 in the comparative example, a ratio of a length 811*h* of the first direction Dx of the rectangular projection range 810 to a length 821*h* of the first direction Dx at the first end 501 of the projectable range 820 of the projection light 800 of the aforementioned projector is smaller than a ratio of a length 812*h* of the first direction Dx of the rectangular projection range 810 to a length 822*h* of the first direction Dx at the second end 502 of the projectable range 820 of the projection light 800 of the aforementioned projector. Thus, the resolution of the virtual image is greatly different in the left-right direction.

Embodiment

Next, the virtual image display device 1 of this embodiment will be described. The translucent screen 20 in the virtual image display device 1 of this embodiment is disposed inclined with respect to the optical axis 100A of the projection light 100 when viewed from the first direction Dx in which the respective regions of the translucent screen 20 from which display light 200 crossing between a first reflection part 30 and a second reflection part 40 is emitted are arranged. Specifically, the translucent screen 20 shown in FIG. 2 is disposed inclined with respect to the optical axis 100A of the projection light 100 in such a manner that an optical path length difference between, a first optical path length 201L of display light 201 which is emitted to the first reflection part 30 from a first end 21 that is far from the display light 200 reflected toward the second reflection part 40 by the first reflection part 30, and a second optical path length 202L of display light 202 which is emitted from a second end 22 that is closer to the 200 reflected toward the second reflection part 40 by the first reflection part 30 than the first end 21, becomes smaller than the optical path length difference in the translucent screen 500 which is disposed vertically to the optical axis 100A of the projection light 100.

Figure 2:
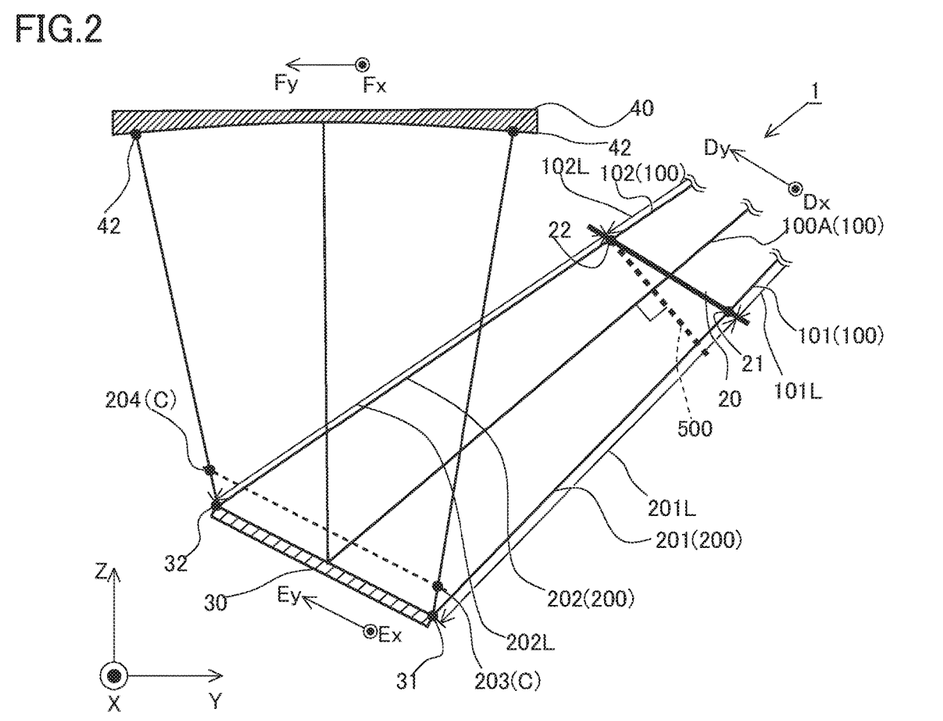
FIG. 2 is a diagram of the virtual image display device in the abovementioned embodiment as viewed from an X-axis direction.
Figure 3:
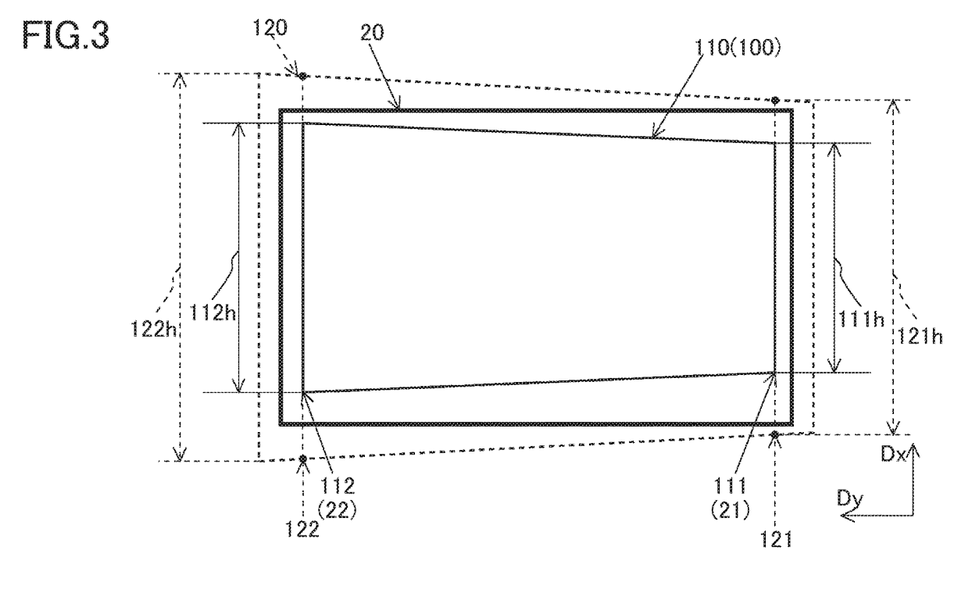
FIG. 3 is a front view of a translucent screen in the abovementioned embodiment and shows a relation between a rectangular projection range on the translucent screen on which a projector projects projection light when generating a rectangular virtual image and a projectable range on which the projector can project the projection light.

FIG. 2 is a view of the virtual image display device 1 of the embodiment of the present invention as viewed from above (X-axis positive direction). The projection light 100 in FIG. 2 shows projection light emitted from the projector 10 when the virtual image display device 1 of this embodiment displays a rectangular virtual image, and first projection light 101 shows projection light incident on the first end 21 located shifted more in a negative direction of the first direction Dx than a position on the translucent screen 20, on which the optical axis 100A of the projection light 100 is incident, and projection light 102 shows projection light incident on a second end 22 located shifted more in a positive direction of the first direction Dx than a position on the translucent screen 500, on which the optical axis 100A of the projection light 100 is incident. In addition, FIG. 3 is a front view of the translucent screen 20 of this embodiment and illustrates a relation between a range 110 (hereinafter also referred to as a rectangular projection range 110) on the translucent screen 20 on which the projector 10 of this embodiment projects the projection light 100 when generating the rectangular virtual image and a maximum range 120 (hereinafter also referred to as a projectable range 120) on which the projector 10 of this embodiment in a same plane (Dx-Dy plane) as the translucent screen 20 can project the projection light 100. In addition, FIG. 4 conceptually shows an optical path of the display light 200 (display light 201, 202) directed from the translucent screen 20 to the second reflection part 40 of this embodiment.

The translucent screen 20 of this embodiment shown in FIG. 2 is disposed inclined with respect to the optical axis 100A of the projection light 100. Therefore, an optical path length 101L of the first projection light 101 from the first end 21 of the translucent screen 20 to the projector 10 and an optical path length 102L of the second projection light 102 from the second end 22 of the translucent screen 20 to the projector 10 shown in FIG. 2 are not equal. Specifically, the optical path length 101L of the first projection light 101 which is incident on the first end 21 on the translucent screen 20, that is far from the display light 200 reflected toward the second reflection part 40 by the first reflection part 30, becomes shorter than the optical path length 102L of the second projection light 102 which is incident on the second end 22 on the translucent screen 20, that is close to the display light 200 reflected toward the second reflection part 40 by the first reflection part 30. Accordingly, as shown in FIG. 3, a range 121*h* of the first direction Dx of a projectable range 121 at the first end 21 of the translucent screen 20 becomes shorter than a range 122*h* of the first direction Dx of the second end 22 of a projectable range 1222 at the second end 22 of the translucent screen 20.

In addition, as shown in FIG. 2, the optical path length 201L of the display light 201 which is emitted from the first end 21 of the translucent screen 20 on the basis of the first projection light 101 and is incident on a first incident position 31 of the first reflection part 30 becomes shorter than the optical path length 202L of the display light 202 which is emitted from the second end 22 of the translucent screen 20 on the basis of the second projection light 102 and is incident on a second incident position 32 of the first reflection part 30 (optical path length 201L<202L). However, the translucent screen 20 of this embodiment is disposed in such a manner that a difference between the first optical path length 201L and the second optical path length 202L is smaller than that between the optical path length 851L and the optical path length 852L in the comparative example.

Figure 4:
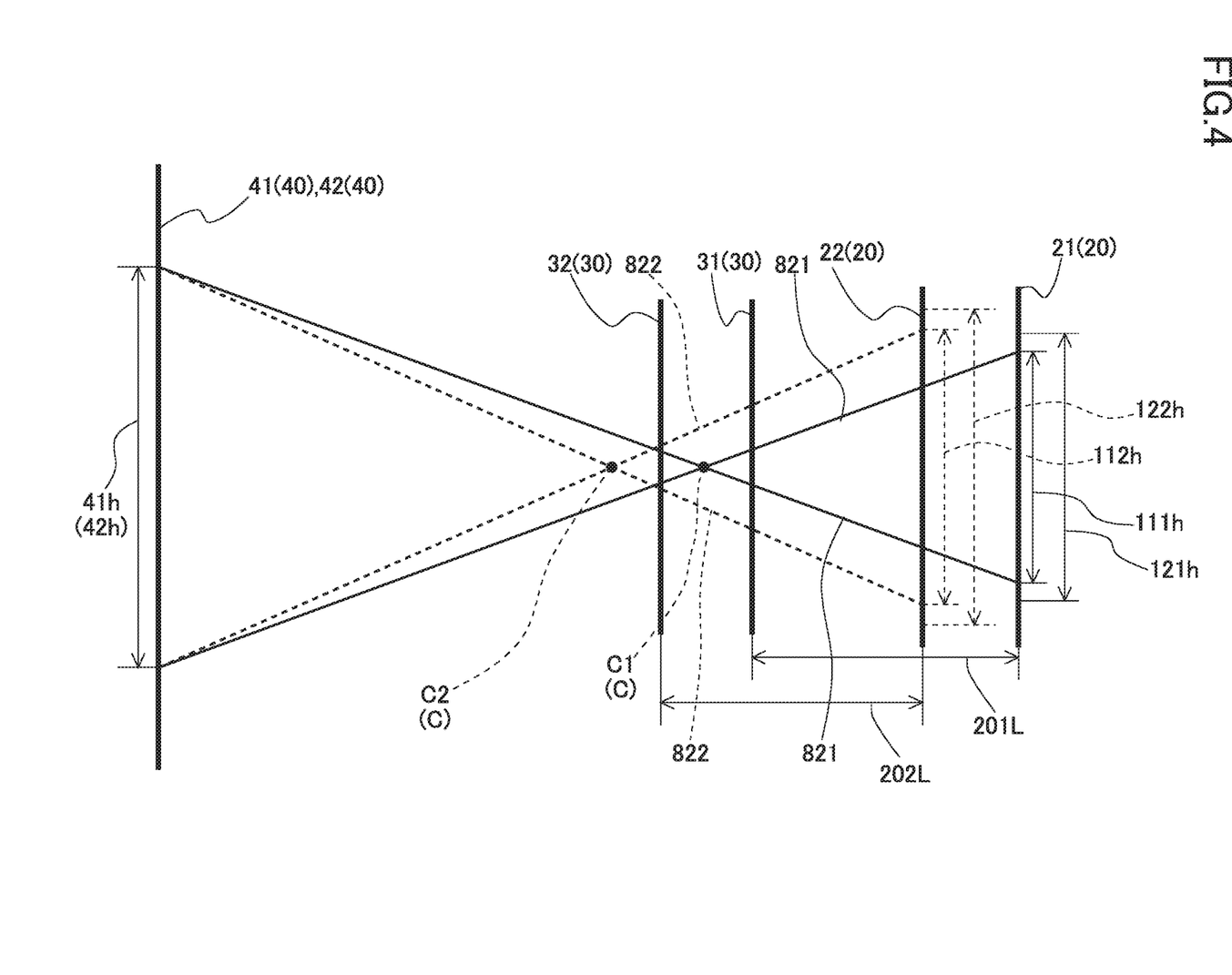
FIG. 4 is a diagram conceptually showing an optical path of display light directed from the translucent screen to a second reflection part in the above embodiment.

That is, as shown in FIG. 4, the first end 21 of the translucent screen 20 of this embodiment is disposed away from the first reflection part 30 side compared to the comparative example (FIG. 8). By tracing the display light 201 from the second reflection part 40 to the first end 21 of the translucent screen 20 crossing at the cross point C1, with reference to a range 41*h* on the second reflection part 40 in such a manner that the range 41*h* in the fifth direction Fx in which the display light 201 is projected on the second reflection part 40 and a range 42*h* in the fifth direction Fx in which the display light 202 is projected on the second reflection part 40 become equal, a range 111*h* in the first direction Dx in which first projection light 101 is projected on the first end 21 of the translucent screen 20 is roughly determined. Meanwhile, by tracing the display light 202 from the second reflection part 40 to the second end 22 of the translucent screen 20 crossing at the cross point C2, with reference to the range 42*h* on the second reflection part 40, a range 112*h* in the first direction Dx of the second projection light 102 on the second end 22 of the translucent screen 20 is roughly determined.

Referring again to FIG. 3, the range 111*h* in the first direction Dx of the first projection light 101 at the first end 21 on the translucent screen 20 becomes shorter than the range 112*h* in the first direction Dx of the second projection light 102 at the second end 22 on the translucent screen 20. By projecting the projection light 100 on such rectangular projection range 110, for example, a rectangular virtual image having a same height in a left side (Y-axis negative direction) and in a right side (Y-axis positive direction) as viewed from the viewer can be generated.

As described above, the virtual image display device 1 of this embodiment is disposed inclined with respect to the optical axis 100A of the projection light 100 in such a manner that the difference between a first optical path length 201L of display light 201 which is emitted to first reflection part 30 from a first end 21 that is far from the display light 200 reflected toward the second reflection part 40 by the first reflection part 30 and the second optical path length 202L of the display light 202 which is emitted from the second end 22 that is closer to the 200 reflected toward the second reflection part 40 by the first reflection part 30 than the first end 21 becomes smaller. With this, it is possible to suppress small a difference between a size (length 112h) of the image M displayed at the first end 21 on the translucent screen 20 and a size (length 122h) of the image M displayed at the second end 22 caused by a warping process for equalizing a size of the virtual image corresponding to the image M displayed at the first end 21 on the translucent screen 20 and a size of the virtual image corresponding to the image M displayed at the second end 22 on the translucent screen 20. Furthermore, the first end 21 on the translucent screen 20 gets closer to the projector 10 than the second end 22 that is the other end, and therefore the projectable range 121h by the projector 10 on the first end 21 side can be made smaller than the projectable range 122h by the projector 10 on the second end 22 side. Accordingly, a ratio between the rectangular projection range 111h and the projectable range 121h at the first end 21 on the translucent screen 20 approaches a ratio between the rectangular projection range 112h and the projectable range 122h at the second end 22 that is the other end, and therefore it is possible to suppress small a difference between resolution of the virtual image corresponding to the image M displayed at the first end 21 on the translucent screen 20 and resolution of the virtual image corresponding to the image M displayed at the second end 22 on the translucent screen 20. In addition, by equalizing the ratio between the rectangular projection range 111h and the projectable range 121h at the first end 21 on the translucent screen 20 and the ratio between the rectangular projection range 112h and the projectable range 122h at the second end 22 that is the other end, it is also possible to equalize the resolution of the virtual image corresponding to the image M displayed at the first end 21 on the translucent screen 20 and the resolution of the virtual image corresponding to the image M displayed at the second end 22 on the translucent screen 20.

In addition, the projector 10 may project the projection light 100 (first projection light 101, second projection light 102) in such a manner that a length 111h along the first direction Dx of the image M displayed on the first end 21 side of the translucent screen 20 is shorter than a length along the first direction Dx of the image M displayed on the second end 22 side. With this, it is possible to suppress small the difference between the resolution of the virtual image corresponding to the image M displayed at the first end 21 on the translucent screen 20 and the resolution of the virtual image corresponding to the image M displayed at the second end 22 on the translucent screen 20, and to further suppress small a difference between the size of the virtual image corresponding to the image M displayed at the first end 21 on the translucent screen 20 and the size of the virtual image corresponding to the image M displayed at the second end 22 on the translucent screen 20.

In addition, the projector 10 may generate the projection light 100 (first projection light 101, second projection light 102) in which a resolution of the image M displayed on the first end 21 side of the translucent screen 20 is made lower than a resolution of the image M displayed on the second end 22 side. Specifically, the projector 10 lowers the resolution of the image M displayed on the translucent screen 20 stepwise or continuously as going in the positive direction of the first direction Dx. With this, in addition to the arrangement of the translucent screen 20 described above, the difference in the resolutions of the virtual images can be further reduced or eliminated.

The present invention is not limited by the above embodiments and drawings. Modifications (including deletion of components) may be appropriately added as long as the gist of the present invention is not changed. One example of variation is shown below.

Figure 5:
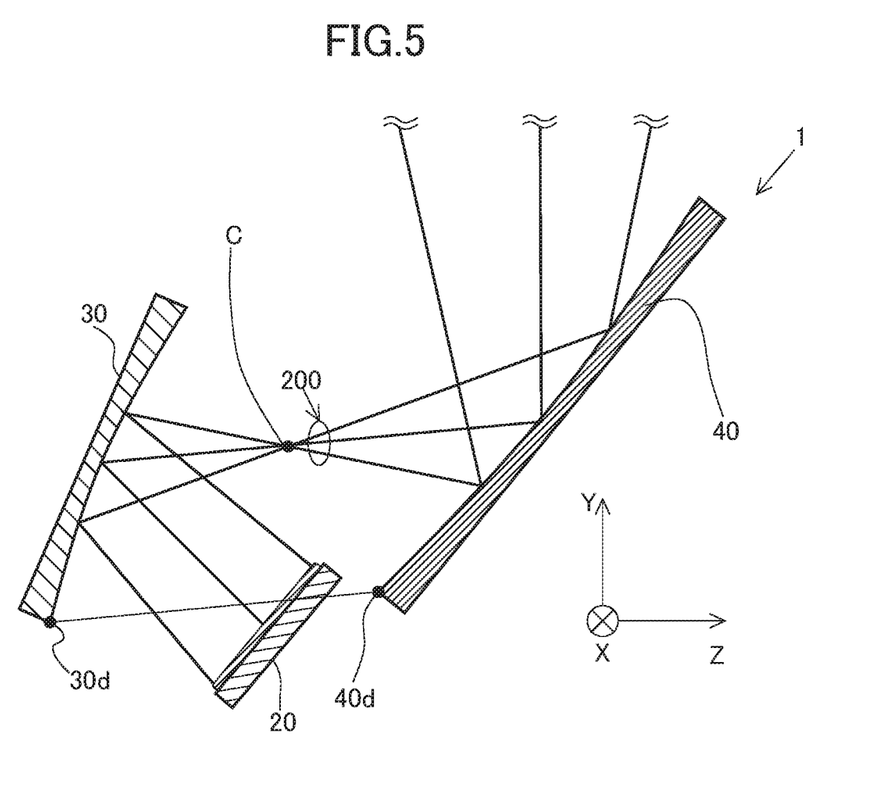
FIG. 5 is a diagram of a virtual image display device according to a variation of the present invention as viewed from the Y-axis direction.

As shown in FIG. 5, in the virtual image display device 1, at least a part of the translucent screen 20 may be located closer to a side of the cross point C of the display light 200 between the first reflection part 30 and the second reflection part 40 than a line segment connecting an end 30d of the first reflection part 30 in proximity to the translucent screen 20 and an end 40d of the second reflection part 40 in proximity to the translucent screen 20. With such a configuration, a size of the virtual image display device 1 can be suppressed small.

In addition, while FIG. 2 shows the display light 200 emitted from the respective regions 20a, 20b, 20c arranged in the first direction Dx of the translucent screen 20 in such a manner that the cross points C at which each display light 200 crosses coincide with each other when viewed from the Y-axis direction, the cross points C at which each display light 200 crosses may not necessarily coincide with each other when vied from a predetermined direction.

In the above embodiment, while the light distribution adjustment part 11 is a free curved surface lens or a cylindrical lens, a rotationally symmetric lens of a spherical or aspherical surface or a toroidal lens may be used as appropriate.

In addition, the light distribution adjustment part 11 may be provided inside the projector 10. In addition, while the light distribution adjustment part 11 has been composed of a single lens, it may be composed of a plurality of lens groups.

In addition, in the above embodiment, while the light distribution adjustment part 11 has been composed of a lens, it may be composed of a mirror having a concave surface.

In addition, while the translucent screen 20 has been a diffusion film in the above embodiment, the translucent screen 20 may be composed of a microlens array or a known translucent screen. By composing the translucent screen 20 of the microlens array, a magnitude of a light distribution angle or a light distribution direction of the display light 200 emitted from the respective regions of the translucent screen 20 can be adjusted for each region of the translucent screen 20, and therefore the display light 200 can be directed to an observer more efficiently.

In addition, the translucent screen 20 may be not flat, and may have a curved surface in some or all of the regions.

In addition, the light distribution adjustment part 11 may be inclined with respect to the translucent screen 20.

In addition, a reflection transmission surface on which the display light 200 is projected is not limited to a window shield of a vehicle. The reflection transmission surface on which the display light 200 is projected may be, for example, a dedicated combiner member.

In the above description, in order to facilitate understanding of the present invention, descriptions of non-important known technical matters have been appropriately omitted.

INDUSTRIAL APPLICABILITY

The present invention is applicable as a display device that allows visual recognition of a virtual image, such as a head-up display device and the like mounted on a vehicle.

DESCRIPTION OF REFERENCE NUMERALS

1 . . . virtual image display device, 10 . . . projector, 11 . . . light distribution adjustment part, 20 . . . translucent screen, 21 . . . first end, 22 . . . second end, 30 . . . first reflection part, 40 . . . second reflection part, 100 . . . projection light, 101 . . . first projection light, 101L . . . optical path length, 102 . . . second projection light, 102L . . . optical path length, 110 . . . rectangular projection range, 120 . . . projectable range, 200 . . . display light, 201 . . . first display light, 202 . . . second display light, Dx . . . first direction, Dy . . . second direction

The invention claimed is:

1. A virtual image display device comprising:
a projector configured to emit projection light;
a translucent screen configured to receive on a back surface side the projection light emitted from the projector to form an image, and to emit display light of the image from a front surface side;
a first reflection part configured to reflect the display light emitted from respective regions arranged in a first direction of the translucent screen in order for the display light to cross with one another; and
a second reflection part configured to reflect the display light reflected by the first reflection part to project the display light on a projection member located forward of a viewer,
wherein the translucent screen is disposed inclined with respect to an optical axis of the projection light in such a manner that a difference between, a first optical path length of the display light emitted to the first reflection part from a first end being far from the display light reflected toward the second reflection part by the first reflection part and a second optical path length of the display light emitted from a second end being closer to the display light reflected toward the second reflection part by the first reflection part than the first end, becomes smaller than that when the translucent screen is disposed vertically to the optical axis of the projection light.

2. The virtual image display device according to claim 1, wherein the projector projects the projection light in such a manner that a length along the first direction of the image displayed on a side of the first end of the translucent screen is shorter than a length along the first direction of the image displayed on a side of the second end.

3. The virtual image display device according to claim 1, wherein the projector generates the projection light in which a resolution of the image displayed on the side of the first end of the translucent screen is made lower than a resolution of the image displayed on the side of the second end.

4. The virtual image display device according to claim 1, wherein the projector generates the projection light in such a manner that a resolution of the virtual image corresponding to the image displayed on the side of the first end of the translucent screen becomes equal to a resolution of the virtual image corresponding to the image displayed on the side of the second end.

5. The virtual image display device according to claim 1, further comprising a light distribution adjustment part configured to be disposed on an optical path of the projection light between the projector and the translucent screen, to have a positive power, and to adjust the projection light incident on the translucent screen in such a manner that the display light from respective regions of the translucent screen converges toward the first reflection part.

6. The virtual image display device according to claim 1, wherein at least a part of the translucent screen is located closer to a side of a cross point of the display light between the first reflection part and the second reflection part than a line segment connecting an end of the first reflection part in proximity to the translucent screen and an end of the second reflection part in proximity to the translucent screen.

\* \* \* \* \*